(12) United States Patent
Bicknell et al.

(10) Patent No.: US 8,811,778 B2
(45) Date of Patent: Aug. 19, 2014

(54) SYSTEMS AND METHOD FOR ROUTING OPTICAL SIGNALS

(75) Inventors: Robert Newton Bicknell, Corvallis, OR (US); Jong-Souk Yeo, Corvallis, OR (US); Pavel Kornilovich, Corvallis, OR (US); Michael Renne Ty Tan, Menlo Park, CA (US); Paul Kessler Rosenberg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1110 days.

(21) Appl. No.: 12/991,048

(22) PCT Filed: May 6, 2008

(86) PCT No.: PCT/US2008/062792
§ 371 (c)(1),
(2), (4) Date: Dec. 15, 2010

(87) PCT Pub. No.: WO2009/017862
PCT Pub. Date: Feb. 5, 2009

(65) Prior Publication Data
US 2011/0164875 A1    Jul. 7, 2011

Related U.S. Application Data

(63) Continuation-in-part of application No. 11/832,559, filed on Aug. 1, 2007, now Pat. No. 7,499,615.

(51) Int. Cl.
*G02B 6/12* (2006.01)
(52) U.S. Cl.
USPC ........... 385/14; 385/49; 385/83; 385/65; 385/50
(58) Field of Classification Search
CPC ....................................... G02B 6/125
USPC ....................................... 385/14, 31
See application file for complete search history.

(56) References Cited

U.S. PATENT DOCUMENTS

| 6,222,967 | B1 | 4/2001 | Amano et al. | |
| 2005/0089262 | A1* | 4/2005 | Jenkins et al. | 385/14 |
| 2006/0171626 | A1 | 8/2006 | McNie et al. | |
| 2006/0215954 | A1* | 9/2006 | Jenkins et al. | 385/18 |

FOREIGN PATENT DOCUMENTS

| JP | 11258434 | 9/1999 |
| JP | 11287926 | 11/1999 |
| WO | WO-03/065091 | 8/2003 |
| WO | WO-2004083916 | 9/2004 |

OTHER PUBLICATIONS

PCT International Search Report for Application No. PCT/US2008/062792, Hewlett-Packard Development Company, L.P., et al.
Supplementary European Search Report for Application No. EP08755088, Hewlett-Packard Development Company, L.P.

* cited by examiner

*Primary Examiner* — Eric Wong (57) ABSTRACT

Systems and a method for routing optical signals are disclosed. One system includes a first large core hollow metal waveguide configured to guide a substantially coherent optical beam. A second large core hollow waveguide is optically coupled to the first waveguide with a coupling device. The coupling device is configured to divide the coherent optical beam into a transmitted beam and a reflected beam. Beam walk-off within the coupling device causes the transmitted beam to be shifted by an offset amount. The second large core hollow metal waveguide is shifted from the first large core hollow metal waveguide by approximately the offset amount to receive the shifted transmitted beam.

20 Claims, 7 Drawing Sheets

SYSTEMS AND METHOD FOR ROUTING OPTICAL SIGNALS

CROSS-REFERENCE TO RELATED APPLICATION

This application is a U.S. National Stage Application of and claims priority to International Patent Application No. PCT/US2008/062792, filed on May 6, 2008, and entitled "SYSTEMS AND METHODS FOR ROUTING OPTICAL SIGNALS", which is a Continuation-in-part of U.S. Ser. No. 11/832,559 filed Aug. 1, 2007, and entitled "SYSTEMS AND METHODS FOR ROUTING OPTICAL SIGNALS", now U.S. Pat. No. 7,499,615.

BACKGROUND

As computer chip speeds on circuit boards increase to ever faster speeds, communication bottlenecks in inter-chip communication are becoming a larger problem. One likely solution is to use fiber optics to interconnect high speed computer chips. However, most circuit boards involve many layers and often require tolerances in their manufacture of less than a micron. Physically placing fiber optics and connecting the fibers to the chips can be too inaccurate and time consuming to be widely adopted in circuit board manufacturing processes.

Routing the optical signals around and between circuit boards can add significant additional complexity. Marketable optical interconnects between chips have therefore proven illusive, despite the need for broadband data transfer.

DETAILED DESCRIPTION OF EXAMPLE EMBODIMENTS

One method for forming optical interconnects between computer chips on a circuit board is to use optical waveguides formed on the circuit board. Optical waveguides can be superior to fiber optic communications for interconnecting electronics because of the ability to form the waveguides on the circuit board using lithographic or similar processes. The waveguides are typically formed on the circuit boards with substantially optically transparent material, such as polymers and/or dielectrics. Optical waveguides made using lithographic or similar processes can also be formed on other types of substrates that are not mounted on a circuit board. For example, optical waveguide(s) may be formed on a flexible substrate to create a ribbon cable having one or more optical waveguides. The optical waveguides disclosed in this application are formed on substrates using lithographic or similar processes.

Forming optical waveguides in this fashion can provide interconnects that are constructed with the necessary physical tolerances to be used on modern multi-layer circuit boards. However, the polymers, dielectrics, and other materials that can be used in chip and circuit board manufacture to form the on-board waveguides are typically significantly more lossy than fiber optics. Indeed, the amount of loss in on-board waveguides has been one of the factors limiting the acceptance of optical waveguide interconnects. Polymers used to construct the waveguides can have a loss of 0.1 dB per centimeter. In contrast, the loss in a fiber optic is around 0.1 dB per kilometer. Thus, polymer waveguides can have losses that are orders of magnitude greater than the loss in fiber optics.

In addition, typical waveguides are usually manufactured to have dimensions that are roughly proportional with the wavelength of light they are designed to carry. For example, a single mode waveguide configured to carry 1000 nm light may have its largest dimension of 1000 nm to 5000 nm (1 µm to 5 µm). Connecting waveguides of this size can be expensive and challenging. The cost of creating and connecting waveguides has historically reduced their use in most common applications. Multimode waveguides may have larger dimensions on the order of 20-60 µm for the core region. Both single and multimode waveguides have a relatively high numerical aperture (NA) of around 0.2 to 0.3 for a core and clad refractive index contrast of 0.01 to 0.02. The numerical aperture determines the divergence of beam from the emitting fiber. Thus, a larger NA will result in poor coupling as a function of fiber to fiber separation. Splitting and tapping of the guided optical beams are also difficult to accomplish using these waveguides. In accordance with one aspect of the invention, it has been recognized that an inexpensive photonic guiding device is needed that is simpler to interconnect with other waveguides and optical devices and that can significantly reduce the amount of loss in an optical waveguide.

Figure 1:
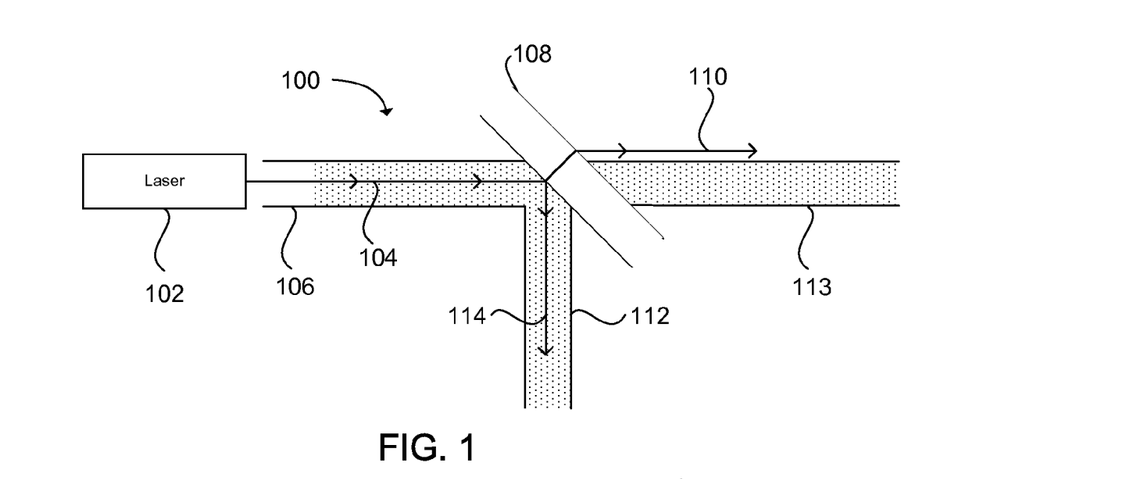
FIG. 1 is an illustration of an embodiment of a large core hollow waveguide coupled to a single mode laser and a beam splitter in accordance with an embodiment of the present invention.

A substantial improvement over traditional optical waveguides formed using polymers or dielectric materials is the use of a large core hollow waveguide 100 configured to guide a coherent optical beam 104, as shown in FIG. 1. The large core hollow waveguide can have a diameter (or width and/or height) on the order of 50 to 150 or more times a wavelength of the coherent optical beam the waveguide is configured to guide. The large core hollow waveguide can have a cross-sectional shape that is square, rectangular, round, elliptical, or some other shape configured to guide an optical signal. Furthermore, because the waveguide is hollow, the optical beam essentially travels at the speed of light in air or a vacuum.

FIG. 1 illustrates a laser 102 emitting a single mode beam 104 into a waveguide 106. A splitter 108 is used to redirect a portion of the optical beam, referred to as the reflected beam 114 into an orthogonal waveguide 112. The remaining optical beam, referred to as the transmitted beam 110, can continue in the same direction as the original beam 104.

It can be seen in the illustration in FIG. 1 that a significant amount of beam walk-off can occur within the beam splitter 108. Beam walk-off is the phenomenon which occurs due to a change in an index of refraction between the hollow waveguide (with the refractive index of air or a vacuum) and the beam splitter. For example, a beam splitter formed of silicon dioxide has an index of refraction of 1.45. A beam splitter formed of $Si_3N_4$ has an index of refraction of 2.20. The beam is refracted as it enters the beam splitter. The angle at which the refraction occurs depends on the difference in the index of refraction between the waveguide and the beam splitter. Beam walk-off is the distance that the beam travels due to the refraction. The distance is typically proportional to the thickness of the optical device, in this case the beam splitter. Beam walk-off can result in a displacement of the mode within the hollow metal waveguide resulting in loss due to excitation of higher order modes near the edges of the waveguide. Lateral displacement can even result in the transmitted beam 110 being directed outside the section 113 of the hollow metal waveguide that occurs after the beam splitter. Even with relatively small amounts of walk-off, cumulative walk-off from multiple splitters can eventually lead to the lateral displacement large enough to cause the beam directed outside of hollow core in the waveguide. The portion of the beam that is outside a waveguide will contribute to loss of power in the optical beam.

Figure 2:
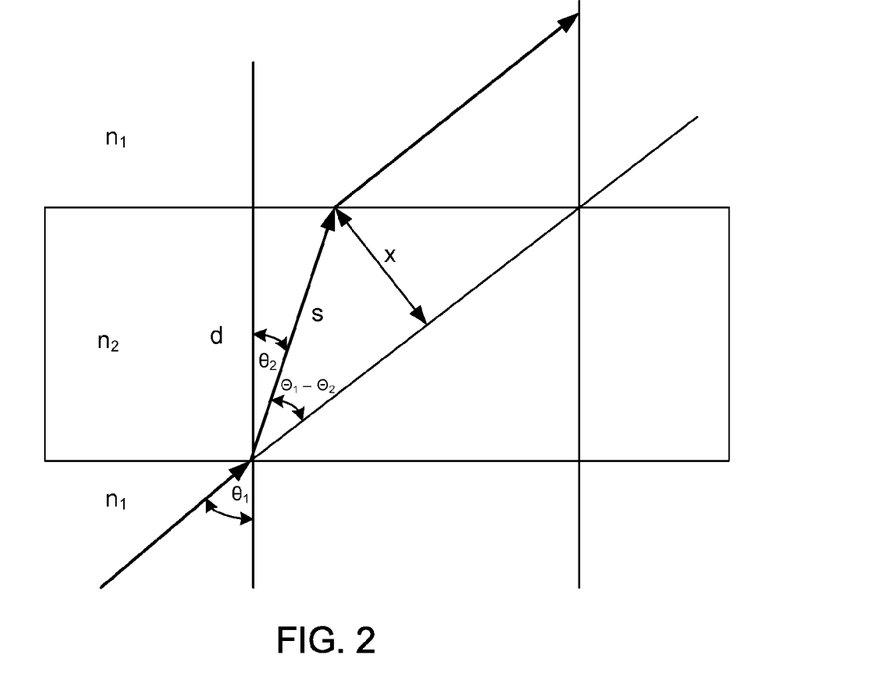
FIG. 2 is an illustration of beam walk-off that occurs within a beam splitter.

An expanded view of the optical tap is shown schematically in FIG. 2. The angle of incidence is denoted as $\theta_1$ in air and $\theta_2$ in the tap media. The optical tap thickness is shown as d, the length of the ray in the tap as s, and the walk-off distance as x. Based on the geometry of the beam entering the tap media, $$\cos(\theta_2) = \frac{d}{s}, \quad (1)$$

$$\frac{x}{s} = \sin(\theta_1 - \theta_2). \quad (2)$$

Substituting equation 1 into 2, one obtains:

$$\sin(\theta_1 - \theta_2) = \frac{x}{\frac{d}{\cos(\theta_2)}}. \quad (3)$$

Solving for the walk-off distance, x:

$$x = \frac{d\sin(\theta_1 - \theta_2)}{\cos(\theta_2)}. \quad (4)$$

Using equation (4) and along with Snell's law:

$$n_1 \sin(\theta_1) = n_2 \sin(\theta_2) \quad (5)$$

One can obtain a relationship between the incident angle of the beam, the indices of refraction of the medium relative to the tap, the thickness of the tap, and the walk-off distance caused by the tap.

Figure 3:
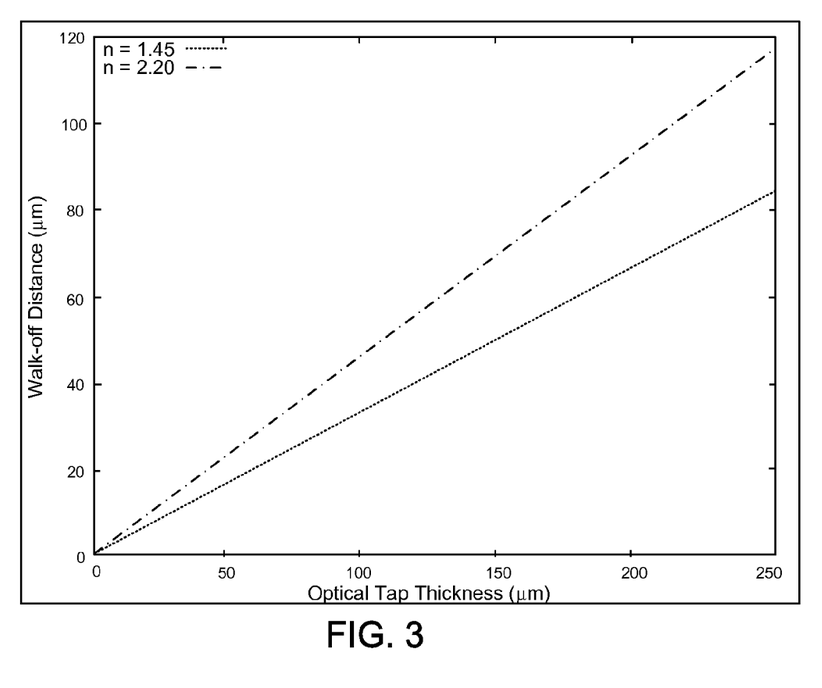
FIG. 3 is a plot that compares the walk-off distance for two indices of refraction for a 45 degree angle of incidence as a function of the optical tap thickness.

FIG. 3 shows a plot that compares the walk-off distance for a 45 degree angle of incidence as a function of the optical tap thickness. Indices of refraction of 1.45 and 2.2 are shown, corresponding to the use of $SiO_2$ and $Si_3N_4$ respectively. The plot shows that the walk-off distance is directly proportional to the tap thickness. Additionally, the walk-off distance is larger for tap material having a larger index of refraction.

Figure 5:
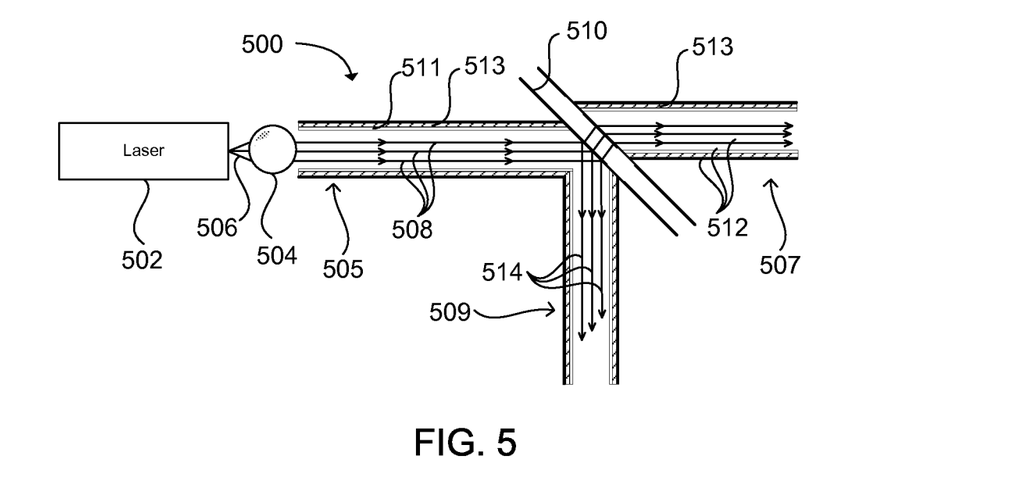
FIG. 5 is an illustration of an embodiment of a multi-mode laser coupled to a large core hollow waveguide having a reflective interior with a collimating lens and a coupling device to an offset large core hollow waveguide.

Beam walk-off can appear exaggerated when using comparatively small waveguides. For example, even when a relatively thin beam splitter 108 having a thickness of approximately 250 μm (¼ millimeter) is used in a 50 μm waveguide, the beam walk-off of a transmitted beam traveling through the beam splitter can be a lateral shift on the order of 75 μm, 1.5 times the thickness of the waveguide. To compensate for the lateral shift of the beam walk-off, the waveguide can be shifted, as illustrated in FIG. 5.

Shifting the position of the waveguides at each junction to compensate for beam walk-off can complicate manufacturing. One alternative to minimize beam walk off is to minimize the thickness of the beam splitters. This is more fully disclosed in the copending U.S. patent application Ser. No. 11/832,559 filed on Aug. 1, 2007. However, the use of extremely thin beam splitters can provide different manufacturing complications. In some embodiments, the use of shifted hollow metal waveguides can be economical relative to other methods, such as the use of thin beam splitters. This is especially true for hollow core metallic waveguides since coupling loss in and out of hollow core waveguides is very small compared to other types of waveguides.

Transfer loss caused by a coupling device can be calculated for uniform power distribution as a ratio of the walk-off distance to the waveguide width:

$$\text{Loss} = 100 \times \left(\frac{walkoff}{waveguide\ \text{width}}\right) \quad (6)$$

Figure 4:
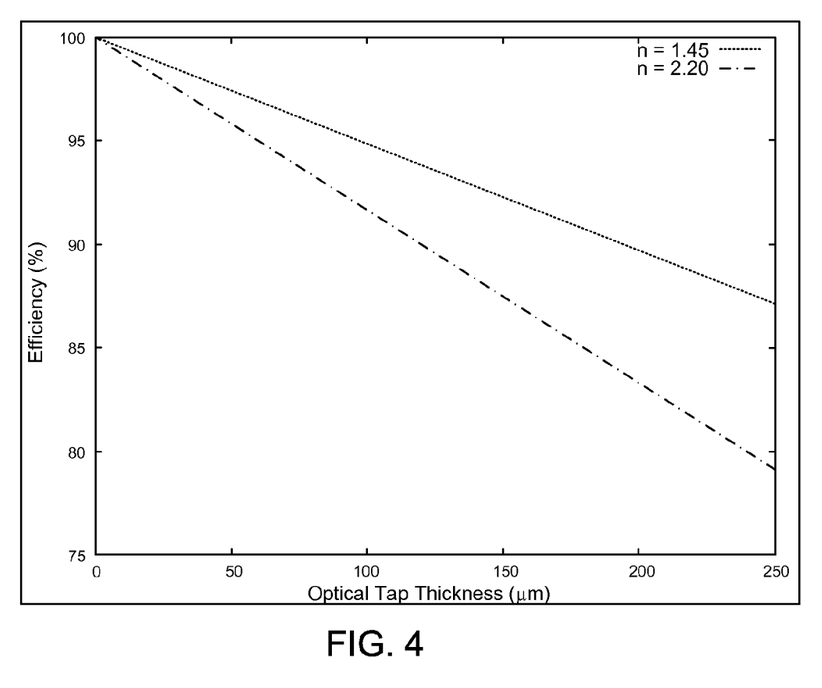
FIG. 4 is a plot that compares optical beam efficiency for two indices of refraction for a 45 degree angle of incidence as a function of the optical tap thickness.

FIG. 4 shows a plot of transfer efficiency as a function of tap thickness for two different tap indices of refraction, assuming a uniform power distribution in the waveguide.

Significant losses can occur within a waveguide if the optical pathway through the waveguide is not substantially straight. Bends or turns that occur in the waveguide can cause the optical beam to have an unwanted number of bounces, causing a substantial amount of attenuation. To enable optical signals to be routed in a different direction, mirrors, splitters, and lenses can be used.

In order to decrease loss within a hollow core waveguide, a reflective coating 513 may be added to cover an interior of the waveguide 500, as shown in FIG. 5. The reflective coating can be formed using a plating, sputtering, or similar process, as can be appreciated. If the hollow waveguide comprises a polymer or other material with a low melting point, the reflective coating may be applied using a low temperature process such as sputtering, electroplating or thermal evaporation.

The reflective coating 513 can be comprised of one or more layers of metal, dielectrics, or other materials that are substantially reflective at the wavelength of the coherent optical beam. The metals can be selected based on their reflectivity. A highly reflective layer covering the channel is desired. For example, the reflective layer may be formed using silver, gold, aluminum, or some other metal or alloy that can form the highly reflective layer. Alternatively, the reflective layer may be a dielectric stack which can be formed from one or more layers of dielectric material that is substantially reflective at a selected wavelength. Before the reflective layer is deposited, the uncoated hollow channel may be subject to a heat reflow to smooth out any surface roughness. The reflective layer may also undergo a heat reflow or similar process to smooth surface roughness in the reflective layer that may occur during the deposition process. Electro-polishing may also be used to smooth out the reflective metal surface.

If the photonic guiding device is not hermetically sealed, the reflective coating 513 may oxidize over time. Oxidation of the reflective coating can substantially reduce its reflectivity. To reduce or eliminate degradation of the metal coating's reflectivity, a protective layer 511 can be formed over the reflective coating to act as a protective. The protective layer can comprise a material that is substantially transparent at the wavelength of the coherent optical beam. For example, the protective layer can be formed of silicon dioxide, aluminum nitride, or some other material that can form a substantially air tight bond over the reflective coating. This protective layer will also reduce the propagation loss by further separating the propagating optical beam from the lossy reflective layer.

Hollow waveguides having reflective surfaces operate differently than solid waveguides. Hollow waveguides work using the principle of attenuated total internal reflection guiding light through reflection from the reflective layer(s) and not through total internal reflection between a higher index core region and a lower index cladding region, as typically occurs in solid waveguides such as an optical fiber. The optical beam within the hollow waveguide may be reflected at angles than what is necessary for total internal reflection, as can be appreciated.

Ideally, a single mode laser is typically used to direct coherent light into a hollow waveguide. However, single mode lasers can be relatively expensive. It has been discovered that a less expensive, multi-mode laser such as a vertical-cavity surface-emitting laser (VCSEL) can be useful in communicating high data rate signals through relatively short distances using hollow waveguides having reflective inner surfaces. For example, multi-mode lasers can be used to direct high data rate signals through large core hollow reflective waveguides used inter-chip and inter-circuit board connections. The use of multi-mode lasers can significantly decrease the cost of optical interconnects, enabling their use to interconnect a much wider variety of electronic devices. However, multi-mode laser output can have significantly greater losses when directly coupled to a hollow metal waveguide due to multiple reflections of higher modes which propagate at large angles.

To overcome the attenuation of the higher modes emitted from a multi-mode laser 502, a collimator 504 can be placed within a path of the multi-mode coherent light rays 506 emitted from the laser. The collimator can be a collimating lens or series of lenses. In one embodiment, the collimator can be configured as a ball lens. The ball lens can have an anti-reflective coating.

The collimator 504 is configured to collimate the multi-mode beam to cause a plurality of the multiple modes, or rays 506 emitted from the laser 502 to form a collimated beam 508 in which the multiple modes travel substantially in parallel within the large core hollow waveguide 500. Collimation of the multi-mode beam can be used to efficiently couple the multimode laser to the low loss mode of the hollow metal waveguide by launching rays which are nearly parallel to the waveguide, substantially reducing the number of reflections that occur within the waveguide. Reflections of the collimated beam that do occur within the waveguide will typically be at a relatively shallow angle with respect to the waveguide walls, thus minimizing the number of reflections within the waveguide and therefore reducing the attenuation of the optical beam within the hollow waveguide.

For example, a coherent multimode beam of 850 nm light can be transmitted through a 150 μm large core waveguide having a reflective coating with a loss on the order of 0.07 dB/cm. The numerical aperture of the optical beam exiting the waveguide was determined to be less than 0.05. The losses of the waveguide can scale with its size. Smaller size waveguides have higher losses due to the greater number of internal reflections (bounces) in the waveguide. Thus, larger waveguides may be used to reduce loss.

FIG. 5 illustrates a system in which a multi-mode laser 502 emits a multi-mode coherent optical beam 506. The multi-mode coherent optical beam comprises a plurality of rays at increasing angles. The rays are sent through a collimator 504, as previously discussed, to enable the rays to be substantially parallel within the large core hollow waveguide 500. The collimator may be a single lens. Alternatively, the collimator may be comprised of a plurality of lenses configured to enable the rays in the multi-mode coherent beam to be substantially parallel. Additionally, a diameter of the beam may be condensed by the collimator to underfill the waveguide. In other words, the collimated beam can have a diameter that is less than a diameter, width, or height of the waveguide. Condensing the collimated beam to underfill the waveguide can reduce the interaction of the outer modes or rays with the reflective coating on an interior of the hollow large core waveguide and also allow for larger misalignment tolerance.

Even with the coherent beam 508 collimated and condensed to underfill the large core hollow waveguide 500, a width or diameter of the beam can fill a substantial portion of the waveguide. For example, the collimated beam may have a diameter that is greater than half a width of the waveguide. The width of the multi-mode collimated beam, relative to a single-mode beam, can reduce the misalignment tolerances of the multi-mode beam within the waveguide.

A reflected portion 514 of the substantially collimated multi-mode coherent optical beam may be redirected from a first large core hollow waveguide 505 to a second large core hollow waveguide 509 using a coupling device 510 that is optically coupled to the first and second waveguides. The coupling device can be configured to redirect at least a portion of the optical beam from the first to the second waveguide, while enabling the rest of the energy to remain in the first waveguide. In accordance with one aspect of the invention, the width and refractive index of the coupling device can be selected to provide a desired amount of beam walk-off.

While FIGS. 1 and 5 have provided exemplary illustrations directing collimated laser beams through the large core hollow waveguides, the use of large core hollow waveguides are not limited in use to only collimated beams or coherent optical beam from a laser source. For example, non-collimated laser light can be introduced into the large core hollow waveguides. Higher order modes will be naturally filtered within the waveguides due to the greater number of reflections that the higher modes undergo. Thus, even a non-collimated optical beam that is input into a first waveguide 505 can emerge from the first waveguide as substantially a collimated optical beam that can be divided into a transmitted beam 512 and reflected beam 514. The large core hollow waveguides may also be used with substantially coherent light emitted from a light emitting diode, or another source of substantially coherent light.

As previously discussed, the beam walk-off is the offset amount of the beam within the waveguide caused by refraction of the optical beam within the coupling device. Equation (4) can be used to calculate the amount of beam walk-off that will occur for a coupling device with a known thickness, angle, and refractive index. A third large core hollow waveguide 507 can be shifted to receive the offset transmitted portion 512 of the multimode coherent optical beam after it has been shifted within the coupling device 510. It should be noted that little or no beam walk-off occurs for the reflected portion 514 that is redirected through reflection off of a surface of the coupling device.

Figure 6A:
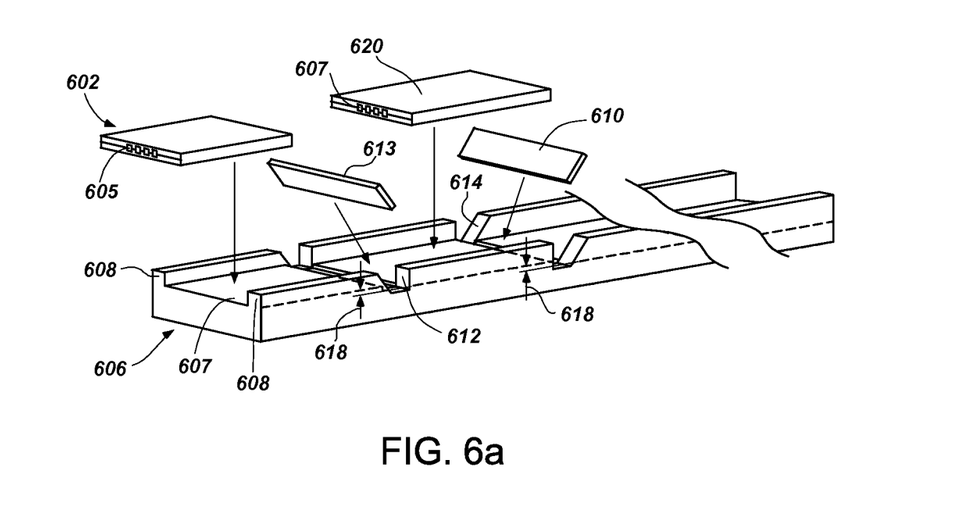
FIG. 6*a* is a perspective view of an embodiment of a waveguide support frame carrying offset large core hollow waveguide blocks.

In order to provide an economical method for manufacturing a large core hollow waveguide that uses lateral shifting to compensate for beam walk-off that occurs at one or more couplings along the waveguide, one or more large core hollow waveguides can be formed as large core hollow waveguide blocks 602, as illustrated in FIG. 6a. Each block can include one or more large core hollow metal waveguides 605. For example, each block can include from 1 to 16 or more waveguides. Each waveguide can include one or more of the layers used to increase reflectivity and minimize corrosion, as illustrated in FIG. 5. Each waveguide within the block can be substantially parallel and coplanar.

A waveguide support frame 606 can be constructed to carry each large core hollow waveguide block 602. The length of each block operable for mounting on the support frame is determined by the number of times a portion of a signal will need to be added to or extracted from one or more of the waveguides located in the block. When it is desired to add or extract a signal from a waveguide, a coupling device 610 such as an optical splitter can be inserted between blocks.

In one embodiment, the waveguide support frame 606 can include first and second retaining walls 608. The large core hollow waveguide block 602 can be inserted into the support frame between the retaining walls. The retaining walls can be formed to position the blocks with minimal lateral offset to ensure that the waveguides in a first block are substantially horizontally aligned with the waveguides in a second block.

A groove 612 can be cut in the retaining walls 608 and/or a center section 607 of the waveguide frame 606. The groove forms a coupling device support wall 614 that allows a coupling device to be inserted between the blocks. Coherent optical beams directed through each waveguide 605 within a block 602 can be split at the coupling device into a reflected portion and a transmitted portion. The amount of energy in each of the portions can be selected by designing the coupling device to have a predetermined transmittance to reflectance ratio. Alternatively, a portion of each coupling device can be substantially fully reflective, with the remaining area being substantially fully transmissive. In this embodiment, the amount of energy transmitted is determined by the size of the reflective area compared to the size of the transmitting area.

In one embodiment, the groove 612 in the waveguide frame 606 can be cut at a 45 degree angle to allow the coupling device 610 to be inserted into the groove and be supported at the coupling device support wall 614 at an angle of approximately 45 degrees. Placing the coupling device at an angle of 45 degrees allows the reflected optical beam to be directed at an angle of approximately 90 degrees relative to the longitudinal axis of the waveguide(s) 605 in each large core hollow waveguide block 602. Directing the reflected portion at an angle of 90 degrees can allow additional components such as receivers, transmitters, modulators, demodulators, and the like to be mounted directly above the coupling device.

The transmitted portion of the optical beam from each waveguide 605 in the large core hollow metal waveguide block 602 can travel through the coupling device and be output with a beam walk-off offset amount that can be calculated using equation (4). For example, in the exemplary embodiment illustrated in FIG. 6a, the amount of vertical offset that occurs at each coupling device 610 can be approximately 70 micrometers (µm) for a beam splitter positioned at 45 degrees, having a thickness of 210 µm and an index of refraction of 1.45.

In one embodiment, the offset amount caused by beam walk-off in the coupling device 610 can be compensated for by forming a step 618 in the waveguide frame 606. A step having a height that is approximately equal to a calculated vertical movement x (equation 4) caused by the beam walk-off in the coupling device 610 allows a receiving block 620 to receive the transmitted portion of the beam that was split at the coupling device.

Each large core hollow waveguide block 602 can be substantially accurately mounted within the support frame 606 to allow each coherent beam inside at least one first waveguide 605 in the first block 602 to be transmitted to a receiving block 620 having at least one second waveguide 607 while minimizing any additional loss within the large core hollow waveguides due to coupling of the coherent optical beams with the waveguide walls. In order to minimize the loss, the coherent optical beams can be directed at approximately a center of each waveguide in each block. In one embodiment, each block can be mounted within the support frame using wafer level bonding.

In another embodiment, a coherent beam from an external source, such as a laser or a light emitting diode, can be directed into at least one waveguide 605 within a block 602. A fully or partially reflective mirror 613 can be used to direct the coherent beam into a receiving block 620. In one embodiment, the partially reflective mirror can be a splitter and/or combiner, operable to combine light from a first block 602 with the external source. A portion of the coherent optical beams can then be removed at one or more of the coupling devices 610, as previously discussed.

Figure 6B:
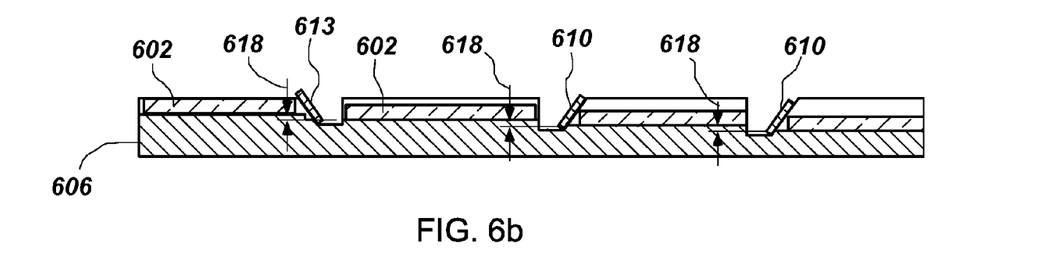
FIG. 6*b* is a side view of the waveguide support frame of FIG. 6*a*.

FIG. 6b illustrates a waveguide support frame 606 having a plurality of large core hollow metal waveguide blocks 602 mounted thereon. At each location of a coupling device 610, the support frame provides a step 618 to compensate for lateral beam walk-off that occurs within the coupling device. In this exemplary embodiment, a step of approximately 70 micrometers is used to compensate for the beam walk-off that occurs in a silicon dioxide optical splitter with an optical path of approximately 210 micrometers.

Returning to FIG. 6a, another embodiment to adjust for the offset amount caused by beam walk-off in the coupling device can be compensated for by increasing a height of the waveguide 605 in adjacent large core hollow metal waveguide blocks 602. This method works best over a relatively short waveguide routing system that includes less than ten different waveguide blocks. This offset compensation scheme is limited due to the effects of changes in the polarization independence of the coherent optical beam. The polarization independence changes when one dimension of the large core hollow metal waveguide is substantially larger than another dimension, such as a height being substantially greater than a width. The loss of polarization independence of the coherent optical beam can cause additional optical losses within the waveguide. Thus, this embodiment is limited in the number of times the height of the waveguide(s) in adjacent blocks can be increased.

Figure 7:
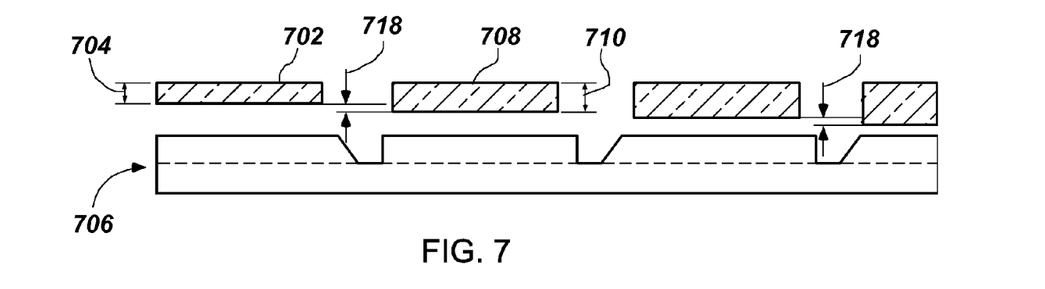
FIG. 7 is a side view of an embodiment of a waveguide support frame carrying large core hollow waveguide blocks having different thicknesses.

In another embodiment, the offset amount caused by beam walk-off in the coupling device can be compensated for by changing a thickness of adjacent large core hollow metal waveguide blocks, as illustrated in FIG. 7. For example, a first waveguide block 702 may have a height 704 of approximately 200 micrometers. A groove 712 can be cut between each block that is mounted on a waveguide support frame 706. A height 710 of the adjacent block 708 can be increased by a selected amount 718, such as approximately 70 micrometers, to compensate for the offset amount caused by beam walk-off in the coupling device mounted in the groove. The change in height or thickness of the block can allow each of the offset transmitted beams that travel through the coupling device to enter waveguide(s) in the adjacent block that have been offset by the offset amount due to the change in height of the block. Each following block can have a height or thickness increased by the amount needed to compensate for beam walk-off caused by the adjacent coupling device. The walk-off offset amount that occurs at each coupling device may be substantially equal if coupling devices of equal thickness, angle, and material type are used. If different types of coupling devices are used, the offset amount will vary based on the characteristics of the coupling device, as previously discussed.

Figure 8:
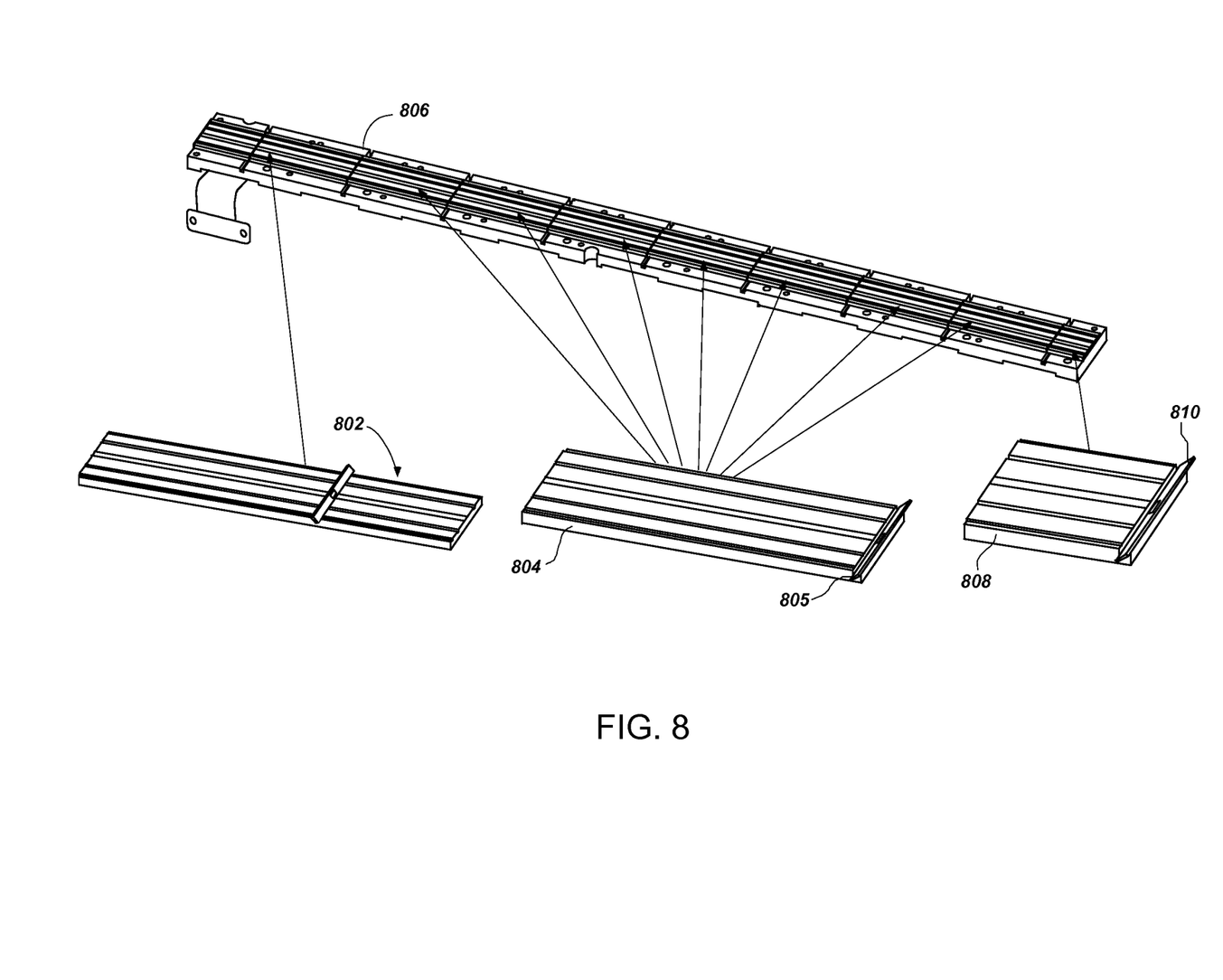
FIG. 8 is a perspective view of an embodiment of a large core hollow waveguide optical system.

FIG. 8 illustrates one embodiment of a system for routing optical signals using large core hollow metal waveguides that are offset at coupling locations. The system includes a first large core optical waveguide section 802 that is configured to receive a plurality of optical beams from an outside source and direct the plurality of optical beams into a corresponding number of large core hollow metal waveguides in the section. The first section can be mounted on a waveguide support frame 806. A plurality of standard waveguide blocks 804, each having the plurality of large core hollow metal waveguides, can be attached to the support frame. Between each standard block, an optical beam splitter 805 can be positioned to split the beam and form a transmitted beam and a reflected beam to allow a portion of the optical beam to be removed from the optical signal path along the frame. The large core hollow metal waveguides can be offset after each optical beam splitter to compensate for beam walk-off that occurs in the splitter and allow the shifted optical beams to travel in the following section. The waveguides can be offset using any of the techniques that were previously mentioned, such as using a step on the support frame, changing a thickness of the section, or changing a height of each waveguide in the section. A final waveguide section 808 can also be attached to the support frame. The final section may include an optical sink 810 that substantially absorbs the remaining optical beam in the system to prevent unwanted reflections. Alternatively, the final section may include a beam splitter to extract the remaining optical signal, or a mirror to allow a signal to be input into the section.

Figure 9:
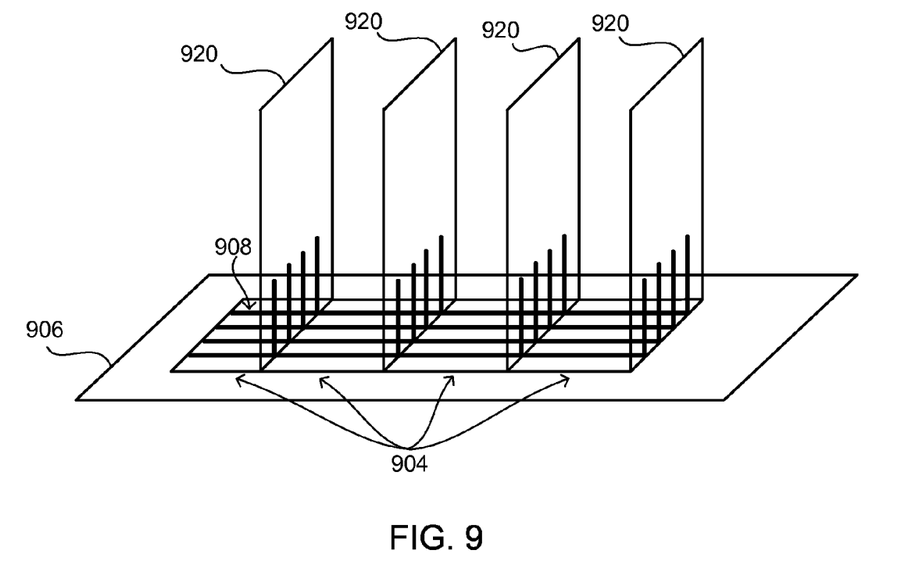
FIG. 9 is a perspective view of an embodiment of the large core hollow waveguide optical system with attached daughter cards.

FIG. 9 illustrates one embodiment of the system of FIG. 8 with a waveguide support frame 906 carrying a plurality of standard waveguide blocks 904. Each waveguide block includes a plurality of large core hollow metal waveguides 908. Between each block is an optical beam splitter that splits the optical beams into transmitted beams and reflected beams. The reflected beams are directed into daughter cards 920 that are substantially orthogonal to the support frame 906. The transmitted beams are directed into the next block that is offset to compensate for beam walk-off that occurs at each beam splitter.

Figure 10:
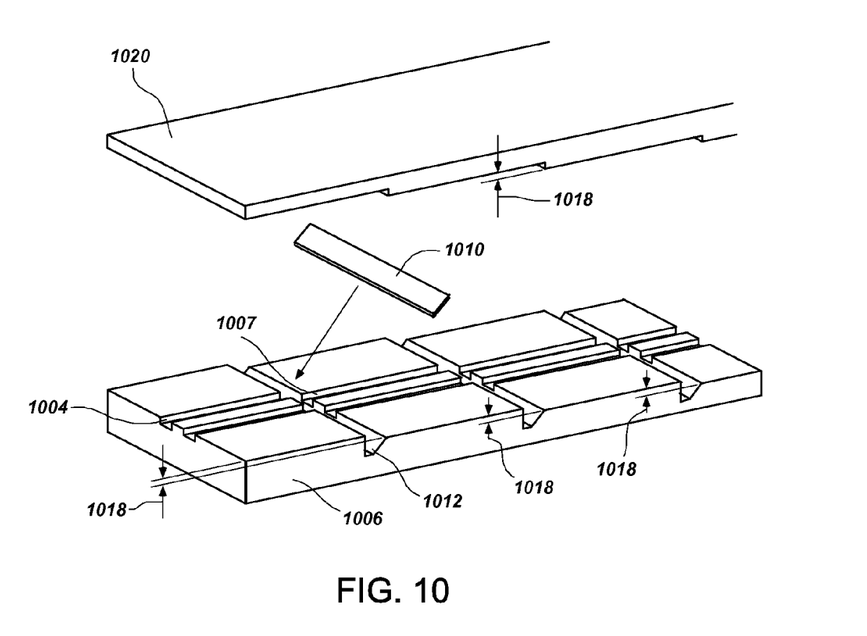
FIG. 10 is a perspective view of an embodiment of a large core hollow waveguide optical system.

FIG. 10 illustrates another embodiment of a system for routing optical signals using large core hollow metal waveguides that are offset at coupling locations. In the embodiment illustrated in FIG. 10, the waveguide support frame and large core hollow waveguide blocks can be integrated in a single structure 1006. The integrated structure can be formed through lithographic processes, injection molding, embossing, or similar processes. The structure can be metallized using a low temperature metallization process. Grooves 1012 can be formed in the structure to allow a coupling device 1010 to be inserted and allow optical beams to be coupled into or out of the waveguide(s) 1004. An offset amount 1018, such as the 70 micrometers discussed in previous embodiments, can be included between waveguides at each coupling device location. The offset can be used to account for beam walk-off that occurs within the coupling device, as previously discussed.

A cover 1020 can be formed using lithographic processes, injection molding, embossing, or similar processes. The cover can also be metallized using a low temperature metallization process and applied over the integrated structure 1006. The cover can include steps 1018 to allow the cover to be substantially the same height over each integrated block in the integrated structure. The integrated structure and cover can be formed in substantially any shape or configuration for desired applications.

Figure 11:
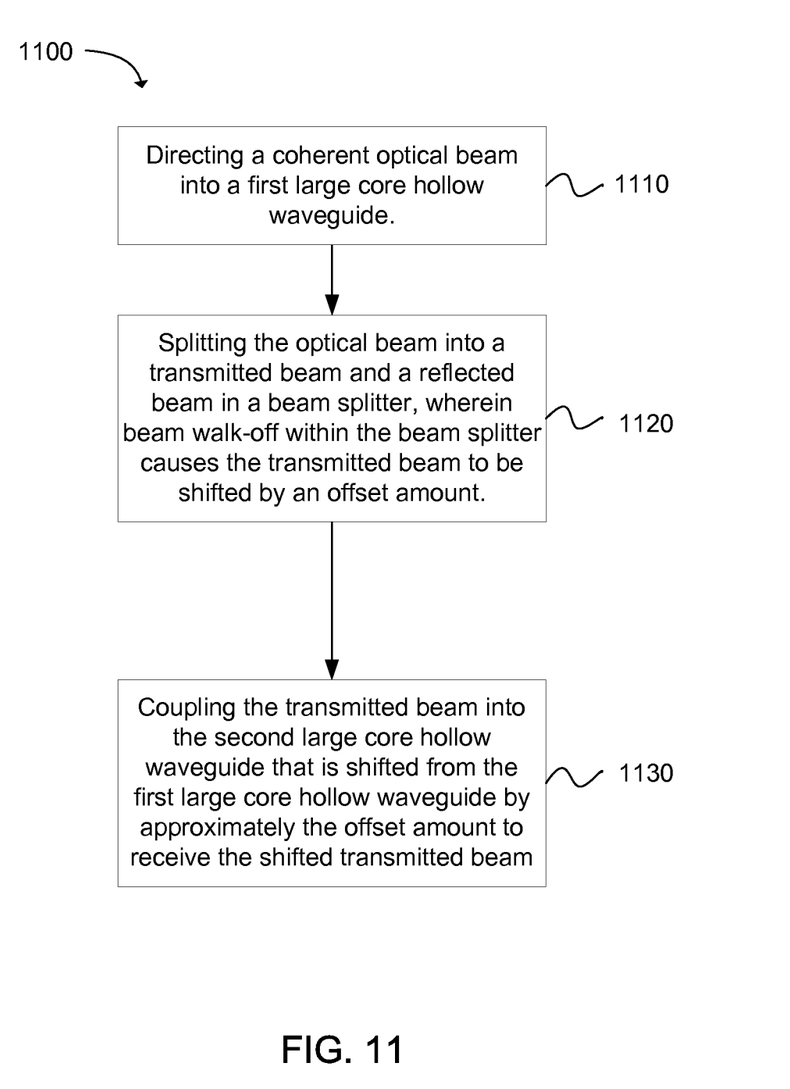
FIG. 11 is a flow chart depicting an embodiment of a method for routing optical signals.

In another embodiment, a method 1100 for routing optical signals is disclosed, as illustrated in the flow chart of FIG. 11. The method includes the operation of directing 1110 a coherent optical beam into a first large core hollow waveguide having a reflective coating covering an interior of the first large core hollow waveguide. As previously discussed, the reflective coating can be formed using a process such as electroplating, sputtering, thermal evaporation, or another similar process, as can be appreciated.

An additional operation for the method 1100 includes splitting 1120 the optical beam into a transmitted beam and a reflected beam in a beam splitter. Beam walk-off that occurs within the beam splitter causes the transmitted beam to be shifted by an offset amount. A further operation involves coupling 1130 the transmitted optical beam into a second large core hollow waveguide having a reflective coating covering an interior of the second hollow waveguide. The second large core hollow waveguide is shifted from the first large core hollow waveguide by approximately the offset amount to receive the shifted transmitted beam.

Large core hollow waveguides can be used to interconnect electronic devices located on one or more circuit boards. The electronic devices may have electrical outputs and inputs that are converted to optical output for transmission through the optical waveguides. Alternatively, the electronic devices may be optical devices that transmit and receive optical signals without a need for conversion. The large core hollow waveguide with a reflective coating on an interior of the waveguide can substantially reduce loss of the optical signal guided through the waveguide relative to solid waveguides. The reflective coating on the interior of the hollow waveguide can minimize loss caused by reflections of the optical signal within the waveguide.

Single mode lasers are typically used in conjunction with hollow waveguides to minimize reflections. However, it has been discovered that a multi-mode laser may be combined with a collimator to provide a multi-mode coherent light source having collimated rays. Use of the multi-mode laser can significantly reduce production costs. Other forms of substantially coherent light can also be used, such as light emitting diodes.

The collimated multi-mode coherent optical beam can fill a significant portion of the large core hollow waveguide. The beam can be directed about the center of the waveguide to minimize contact between the waveguide and the multi-mode beam and reduce a number of reflections. A portion of the beam can be directed into adjacent waveguides using a coupling device. The adjacent waveguides can be located in hollow metal waveguide blocks. The coupling device can cause the transmitted beam to be shifted by an offset amount. This offset can be compensated for by (1) mounting the waveguide blocks on a waveguide support frame that is stepped after each coupling device to shift the waveguide(s) by the offset amount; (2) changing a thickness of an adjacent block to shift the waveguide(s) in the adjacent block by the offset amount; and (3) changing a height in the waveguides in an adjacent block by the offset amount. The ability to create a system in which the coherent optical beam can be divided at multiple points along a waveguide using manufacturable techniques enables optical interconnects to be manufactured and produced at significantly reduced costs.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for routing optical signals, comprising:
a first large core hollow metal waveguide to guide a substantially coherent optical beam in a first direction;
a coupling device optically coupled to the first waveguide to divide the coherent optical beam into a transmitted beam in the first direction and a reflected beam, wherein beam walk-off within the coupling device causes the transmitted beam to be shifted by an offset amount;
a second large core hollow metal waveguide optically coupled to the coupling device to receive the shifted transmitted beam; and
a first support frame portion supporting the first large core hollow metal waveguide and a second support frame portion supporting the second large core hollow metal waveguide to form a shift between the first large core hollow metal waveguide and the second large core hollow metal waveguide, the shift being approximately the offset amount.

2. A system as in claim 1, wherein the first large core hollow metal waveguide is included in a first block and the second large core hollow metal waveguide is included in a second block.

3. A system as in claim 2, wherein the second block is offset from the first block by approximately the offset amount by a step formed between the first support frame portion and the second support frame portion.

4. A system as in claim 3, further comprising a waveguide support frame including the first support frame portion and the second support frame portion and including the step between the first block and the second block, with a height of the step being substantially equal to the offset amount to allow the shifted transmitted beam to be directed into the at least one hollow metal waveguide in the second block.

5. A system as in claim 2, wherein the shift between the first large core hollow metal waveguide and the second large core hollow metal waveguide is formed by a difference in thickness between the first and second blocks to create an offset between the first and second hollow metal waveguides to allow the shifted transmitted beam from the first large core hollow metal waveguide in the first block to travel into the second large core hollow metal waveguide in the second block.

6. A system as in claim 2, wherein the shift between the first large core hollow metal waveguide and the second large core hollow metal waveguide is formed by a difference in height between the first large core hollow metal waveguide in the first block and the second large core hollow metal waveguide in the second block to allow the shifted transmitted beam from the first large core hollow metal waveguide in the first block to travel into the second large core hollow metal waveguide in the second block.

7. A system as in claim 3, wherein the first block, the second block, and the waveguide support frame are integrated in a single structure, with a step occurring between the first large core hollow metal waveguide in the first block and the second large core hollow metal waveguide in the second block.

8. A system as in claim 1, further comprising a third large core hollow metal waveguide optically coupled to the coupling device and operable to receive the reflected beam from the coupling device.

9. A system as in claim 1, wherein the coherent optical beam is produced by a light source selected from the group consisting of a single mode laser, a multimode laser, and a light emitting diode.

10. A system as in claim 1, wherein the coherent optical beam is collimated.

11. A waveguide system for routing optical signals, comprising:
a first block containing at least one large core hollow metal waveguide to guide a substantially coherent optical beam in a first direction;
a beam splitter configured to split the optical beam in each of the at least one waveguides into a transmitted beam in the first direction and a reflected beam, wherein beam walk-off within the beam splitter causes the transmitted beam to be shifted by an offset amount;
a second block containing at least one large core hollow metal waveguide, wherein the at least one large core hollow metal waveguide in the second block is offset from the at least one large core hollow metal waveguide in the first block by approximately the offset amount to receive the shifted transmitted beam from each of the at least one large core hollow metal waveguides in the first block; and
a waveguide support frame operable to carry the first block, the beam splitter, and the second block.

12. The system of claim 11, further comprising a step in the waveguide support frame between the first block and the second block, with a height of the step being substantially equal to the offset amount to allow the shifted transmitted beam to be directed into the at least one large core hollow metal waveguide in the second block.

13. The system of claim 11, wherein the first block and second block have a difference in thickness to create an offset between the at least one large core hollow metal waveguides in each of the respective blocks to allow the shifted transmitted beam from each large core hollow metal waveguide in the first block to travel into each of the at least one large core hollow metal waveguide in the second block.

14. The system of claim 11, further comprising a third large core hollow metal waveguide optically coupled to the beam splitter and operable to receive the reflected beam from the beam splitter.

15. A method for routing optical signals, comprising:
directing a coherent optical beam in a first direction into a first large core hollow waveguide having a reflective coating covering an interior of the first large core hollow waveguide;
splitting the optical beam into a transmitted beam in the first direction and a reflected beam in a beam splitter, wherein beam walk-off within the beam splitter causes the transmitted beam to be shifted laterally by an offset amount; and coupling the transmitted beam into a second large core hollow waveguide having a reflective coating covering an interior of the second large core hollow waveguide with a coupling device, wherein the first large core hollow waveguide is supported by a first support frame portion and the second large core hollow waveguide is supported by a second support frame portion such that a shift is formed between the first large core hollow metal waveguide and the second large core hollow metal waveguide, the shift being approximately the offset amount.

16. The method as in claim 15, wherein the first large core hollow metal waveguide is included in a first block and the second large core hollow metal waveguide is included in a second block.

17. A method as in claim 16, wherein the second block is offset from the first block by approximately the offset amount by a step formed between the first support frame portion and the second support frame portion.

18. A method as in claim 17, wherein the first support frame portion and the second support frame portion are part of a waveguide support frame, the waveguide support frame including the step between the first block and the second block, with a height of the step being substantially equal to the offset amount to allow the shifted transmitted beam to be directed into the at least one hollow metal waveguide in the second block.

19. A method as in claim 16, wherein the shift between the first large core hollow metal waveguide and the second large core hollow metal waveguide is formed by a difference in thickness between the first and second blocks to create an offset between the first and second hollow metal waveguides to allow the shifted transmitted beam from the first large core hollow metal waveguide in the first block to travel into the second large core hollow metal waveguide in the second block.

20. A method as in claim 16, wherein the shift between the first large core hollow metal waveguide and the second large core hollow metal waveguide is formed by a difference in height between the first large core hollow metal waveguide in the first block and the second large core hollow metal waveguide in the second block to allow the shifted transmitted beam from the first large core hollow metal waveguide in the first block to travel into the second large core hollow metal waveguide in the second block.

* * * * *